United States Patent
Nakamura et al.

(10) Patent No.: US 9,445,609 B2
(45) Date of Patent: Sep. 20, 2016

(54) METHOD AND DEVICE FOR ADJUSTING THE SUSPENDED FORM OF SAUSAGES AND SUSPENDED SAUSAGE LOOP CONVEYING APPARATUS

(71) Applicant: HITEC Co., Ltd., Kanagawa (JP)

(72) Inventors: Shinjiro Nakamura, Kanagawa (JP); Tatsuo Nakamura, Kanagawa (JP); Kenji Suzuki, Kanagawa (JP)

(73) Assignee: HITEC Co., Ltd., Kanagawa (JP)

( * ) Notice: Subject to any disclaimer, the term of this patent is extended or adjusted under 35 U.S.C. 154(b) by 0 days.

(21) Appl. No.: 14/947,096

(22) Filed: Nov. 20, 2015

(65) Prior Publication Data
US 2016/0174582 A1    Jun. 23, 2016

(30) Foreign Application Priority Data
Dec. 19, 2014    (JP) .................................. 2014-257229

(51) Int. Cl.
A22C 11/00    (2006.01)
A22C 15/00    (2006.01)

(52) U.S. Cl.
CPC ................... *A22C 15/001* (2013.01)

(58) Field of Classification Search
CPC ..... A22C 11/00; A22C 11/10; A22C 11/008; A22C 11/104; A22C 11/108
USPC ....................... 452/30–32, 35–37, 46–48, 51
See application file for complete search history.

(56) References Cited

U.S. PATENT DOCUMENTS

| | | | | |
|---|---|---|---|---|
| 6,786,321 B2 * | 9/2004 | Borkiewicz | .......... | A22C 15/001 198/419.3 |
| 6,866,573 B2 * | 3/2005 | Shefet | .................. | A22C 15/001 452/32 |
| 7,040,975 B2 * | 5/2006 | Shefet | .................. | A22C 15/002 452/31 |
| 7,249,997 B2 * | 7/2007 | Kasai | .................. | A22C 15/001 452/51 |
| 7,255,638 B2 * | 8/2007 | Stimpfl | ................. | A22C 15/007 452/32 |
| 7,520,802 B1 * | 4/2009 | Veldkamp | ............ | A22C 15/001 452/51 |
| 7,588,485 B1 * | 9/2009 | Nakamura | ........... | A22C 15/001 452/51 |
| 7,735,630 B2 * | 6/2010 | Borkiewicz | .......... | A22C 15/001 198/465.4 |
| 8,113,924 B2 * | 2/2012 | Nakamura | ........... | A22C 15/001 452/32 |

* cited by examiner

Primary Examiner — Richard Price, Jr.
(74) Attorney, Agent, or Firm — Bachman & LaPointe, P.C.

(57) ABSTRACT

A device for adjusting the form of suspension of sausages from a stick includes: a pressing member for pressing against the stick two sausages which are at an uppermost position of a sausage loop suspended from the stick; and a moving mechanism for supporting the pressing member at a position where the pressing member is capable of pressing the two sausages and for causing the pressing member to be movable in a longitudinal direction of the stick. The pressing member has two pressing surfaces for downwardly pressing the two sausages which are positioned on both sides in the horizontal direction with respect to a center of the stick, the pressing being effected at positions which are spaced apart from an outer peripheral surface of the stick and are on both sides of the stick in a horizontal direction.

8 Claims, 7 Drawing Sheets

METHOD AND DEVICE FOR ADJUSTING THE SUSPENDED FORM OF SAUSAGES AND SUSPENDED SAUSAGE LOOP CONVEYING APPARATUS

BACKGROUND OF THE INVENTION

1. Field of the Invention

The present invention relates to a method and a device for adjusting the suspended form of a chain of linked sausages suspended from a stick in loop form and an apparatus for conveying suspended sausage loops.

2. Description of the Related Art

A chain of linked sausages has a form in which individual sausages are connected by linked portions constituted by twisted portions. The chains of linked sausages suspended from sticks in order to be heat treated are brought into a heat treatment room and are subjected to heat treatment. Subsequently, the chains of linked sausages are removed from the sticks, and are then cut at the linked portions or casings are peeled off the sausages, thereby producing individually separated sausages. The chain of sausages is required to be suspended from the stick in a state in which its linked portions are in close proximity to or in contact with the stick until the chain of sausages is removed from the stick.

In attempts to enhance productivity in sausage manufacturing, the production system adopted is such that, by using a longer casing, this casing is formed into a greater number of sausage loops and is suspended from a longer stick, and the sausage loops suspended from the stick, while being automatically conveyed, are subjected to heat treatment in a continuous smokehouse. As the aforementioned longer stick used in this production system, a stick with a larger size is desired in order to reduce the deformation of the stick occurring during the handling of the stick and the deflection of the stick due to the weight of the sausage loops. In addition, depending on the structure of the continuous smokehouse, it is required to suspend from the sticks sausage loops with a shorter suspension length than heretofore.

Since the chain of linked sausages is suspended from the stick in a state of being bent at the linked portion, upper end portions of adjacent sausages positioned in close proximity to each other on both sides of this linked portion and suspended on both sides of the stick are brought into closer proximity to or into contact with each other. In the case where a thick stick is used, the two upper end portions (semispherical upper end portions) of the two adjacent sausages suspended from the stick are difficult to be deformed by the stick, and the linked portion is difficult to be brought into close proximity to the stick. This difficulty in being brought into close proximity to the stick increases in the case of a sausage loop whose suspension length is short and whose weight is light and in the case of sausage which is difficult to be deformed due to a stiffly stuffed cellulose casing.

As a result, the sausage loop is suspended from the stick in a state in which cylindrical body portions of left and right sausages have ridden on the stick without being suspended from the stick at the linked portion. If such sausages suspended from the stick in the thus-suspended state are subjected to heat treatment in the continuous smokehouse, an indentation and unevenness in smoking due to the stick occur in the cylindrical body portions of the sausages in contact with the stick, thereby causing the appearance quality of the sausages to decline.

SUMMARY OF THE INVENTION

In view of the above-described circumstances, it is an object of the present invention to provide a method and a device for adjusting the form of suspension of sausages from a stick whereby the suspended form of a chain of linked sausages suspended from a stick in loop form in a state in which the linked portion of the sausages is floated from the stick can be adjusted into such a suspended form that the linked portion is brought into closer proximity to or, preferably, into contact with the stick, thereby making it possible to prevent a decline in the appearance quality of the sausages and enabling sausage production that yields high productivity, as well as an apparatus for conveying suspended sausage loops which is capable of effecting the above-described adjustment while conveying the suspended sausage loops.

In accordance with the present invention, the above-described problems are overcome by any one of a device for adjusting the form of suspension of sausages from a stick, a suspended sausage loop conveying apparatus, and a method for adjusting the form of suspension of sausages from a stick, which are configured as described below.

In accordance with a first aspect of the invention, there is provided a device for adjusting the form of suspension of sausages from a stick, comprising: a pressing member for pressing against a stick two sausages which are at an uppermost position of a sausage loop suspended from the stick; and a moving mechanism for supporting the pressing member at a position where the pressing member is capable of pressing the two sausages and for causing the pressing member to be movable in a longitudinal direction of the stick, wherein the pressing member has a pressing surface for downwardly pressing the two sausages being at the uppermost position which, when viewed in the longitudinal direction of the stick, are on both sides in the horizontal direction with respect to a center of the stick, the pressing being effected at positions which are spaced apart from an outer peripheral surface of the stick and are on both sides of the stick in a horizontal direction, to thereby cause a linked portion connecting the two sausages to be brought into close proximity to or into contact with the stick, and wherein the moving mechanism has a linear movement guiding part for guiding in the longitudinal direction of the stick a supporting unit for supporting the pressing member.

The "position where the pressing member is capable of pressing" referred to herein is a position where the two sausages are pressed against the stick by pressing the sausages downwardly from above to allow deformation to occur in their respective upper end portions, such that the linked portion is brought into closer proximity to than before pressing or into contact with the stick, and it is also a position where the upper end portions can be brought into contact with the stick.

In the present invention thus configured, the pressing member, which is supported by the supporting unit guided in the longitudinal direction of the stick by the linear movement guiding part, presses by its pressing surface the two sausages, which are at the uppermost position, at two positions which are spaced apart from the outer peripheral surface of the stick and are on both sides of the stick. Since this pressing member presses all the loops suspended from one stick while moving in the longitudinal direction of the stick, the pressing force applied to the stick by the pressing member can be smaller than a force required for simultaneously pressing all the loops suspended from one stick. Accordingly, it is possible to reduce the amount of deflection of the stick due to the application of the pressing force. Here, pressing may be simultaneously effected by the pressing member with respect to each number of sausage loops that gives an allowable amount of deflection of the stick.

A plurality of sausage loops may be consecutively pressed one at a time by the pressing member which moves in the longitudinal direction of the stick. If such a configuration is provided, the pressing force applied to the stick can be made even smaller than in the case where all the loops or each group of a plurality of loops are pressed simultaneously, it is possible to further reduce the amount of deflection of the stick due to the application of the pressing force.

As a result of the fact that the amount of deflection of the stick is reduced, the two sausages at the uppermost position are sufficiently pressed against the stick, so that the form of sausages become such that deformation occurs in the upper end portions of the sausages and the stick bites onto the upper end portions of the sausages, whereby the respective linked portions connecting the two sausages at the uppermost position in all the loops can be adjusted into such a form as to be brought into closer proximity to than before pressing or into contact with the stick.

Since the pressing surface downwardly presses the two sausages at positions which are spaced apart from the outer peripheral surface of the stick and are on both sides of the stick, the stick easily bites onto the upper end portions while deforming them, and the linked portion is brought into close proximity to or into contact with the stick. In addition, the linked portion is stretched by being pulled, thereby promoting the contact of the linked portion with the stick.

Since the sausage loops are subjected to heat treatment after adjusting the suspended form of the sausages such that the stick is set in the state of having bitten onto the upper end portions of the sausages, it is possible to prevent the occurrence of an indentation and unevenness in smoking due to the stick which can occur in the cylindrical body portion of the sausage, and to cause the indentation and unevenness in smoking to occur in the upper end portions of the sausages. In consequence, it is possible to prevent a decline in the appearance quality of the sausage.

In addition, since the sausage loops are suspended in the state in which the stick bites onto the upper end portions of the sausages, the suspended state is stabilized, so that it is possible to prevent the drawback that the linked portion rotates on the outer peripheral surface of the stick and becomes disengaged from the stick during the movement of the stick to the heat treatment process. As a result, it is possible to increase the moving speed of the sticks to the heat treatment process, making it possible to enhance the productivity of sausage production.

In the device in accordance with the invention, the pressing member may be constituted by a rotating body, and the pressing surface may be formed on an outer peripheral portion of the rotating body. The pressing surface may be a cylindrical surface which does not have an annular groove which will be described below.

In this configuration, even if the rotating body moves in the longitudinal direction of the stick and abuts against the aforementioned two sausages from the longitudinal direction of the stick, the rotating body, while rotating, is able to press one set of semispherical upper end portions of the two adjacent sausages after another or a cylindrical body portion of the sausage on a continual basis. In consequence, the pressingly advancing force of the rotating body in the longitudinal direction of the stick with respect to the two sausages is reduced, so that a positional deviation of the sausage loops in the longitudinal direction of the stick is unlikely to occur. As a result, it is possible to prevent the occurrence of unevenness in smoking due to the mutual contact of adjacent sausage loops. In addition, it is possible to enhance the productivity by increasing the moving speed of the rotating body in the longitudinal direction of the stick.

In the present invention, the rotating body may have an annular groove formed in the outer peripheral portion thereof, and the pressing surface may be formed by both surfaces of the groove.

In this configuration, since the two sausages are downwardly pressed by the pressing surface formed by the annular groove, the sausages are more likely to enter the underside of the pressing surface.

In the present invention, the supporting unit may have a support shaft which is fitted in the rotating body to support the rotating body, and the rotating body may be formed as a roller which is rotatably supported by the support shaft.

In this configuration, since the roller is rotatably supported by the support shaft, the roller can be rotated by frictional resistance between the roller and the sausages based on the movement of the roller which moves in the longitudinal direction of the stick while pressing the sausages.

In the present invention, the supporting unit may have a support shaft which is fitted in the rotating body to support the rotating body, and the support shaft may receive a rotatively driving force from a rotatively driving unit to rotatively drive the rotating body.

The rotating body which presses the sausages while rotating is able to suppress the positional deviation of the sausage loops in the longitudinal direction of the stick which can occur during the movement of the rotating body in the longitudinal direction of the stick.

In the configuration in which the rotatively driving unit is provided, since pressing can be effected by the rotating body which is rotatively driven with a desired number of revolutions set in the rotatively driving unit, even if the length of the sticks is changed, the pressing of the multiplicity of sausage loops suspended from one stick can be completed within a desired time duration by changing the number of revolutions of the rotating body.

In this case, the rotatively driving unit may include a meshing wheel provided in the supporting unit and a linear meshing member which is mounted in such a manner as to extend in the longitudinal direction of the stick such that the meshing wheel meshes with the linear meshing member during rotation, with the result that while the supporting unit moves in the longitudinal direction of the stick, the meshing wheel meshed with the linear meshing member rotates during its movement, so that its rotation is transmitted to the support shaft by a rotation transmitting member.

In this configuration, since the meshing wheel is rotatively driven on the basis of the movement of the supporting unit which moves in the longitudinal direction of the stick, a speed ratio between the movement of the supporting unit and the rotation of the rotating body can be maintained at a fixed level, thereby allowing reliable pressing to be effected.

As for the rotatively driving unit, the rotation transmitting member may be rotatively driven by a motor in substitution of the meshing wheel and the linear meshing member, or the support shaft may be rotatively driven directly by a motor.

The aforementioned moving mechanism may include a linear movement guiding part, a linearly moving member on which the supporting unit is mounted and which is guided by the linear movement guiding part, and a driving part for driving the linearly moving member so as to move the linearly moving member along the linear movement guiding part.

According to this configuration, since the supporting unit can be stably moved at a desired speed, reliable pressing is made possible. In addition, since the rotating body can also be rotatively driven by the driving part of the moving mechanism via the rotatively driving unit or without via the rotatively driving unit, a driver for the rotating body is not separately required, so that the device is made simple.

The driving part may move the pressing member continuously in the longitudinal direction of the stick or may move it intermittently. If the pressing member is continuously moved, the productivity of the pressing operation increases. In the intermittent movement of the pressing member, it suffices if the movement is stopped during pressing, and pressing is released during movement for pressing a next sausage loop after finishing the pressing of one sausage loop. If such an arrangement is adopted, the positional deviation of the sausage loop in the longitudinal direction of the stick does not occur during the movement of the pressing member in the longitudinal direction of the stick. By so doing, sausages which are particularly difficult to press can be pressed with a large pressing force by using the pressing member having formed thereon the pressing surface which does not rotate.

Further, in the present invention, the pressing surface of the pressing member may be formed by two surfaces which are positioned on both sides with respect to the center of the stick, and an interval between which expands toward a lower side. These two surfaces may be formed by two inclined surfaces or by a curved surface (a recessed curvilinear groove) constituted by one continuous curved surface in which two surfaces are connected.

By so doing, even if the manner of downward expansion of the two sausages at the uppermost position of the respective loops is varied in the multiplicity of loops suspended from one stick, the two sausages can be reliably pressed by the pressing surface. According to this configuration, the two surfaces are able to press the two sausages at the uppermost position from above toward the stick while narrowing the interval between the two sausages from both sides of the center of the stick in the horizontal direction.

In the above-described configuration in which the pressing surface of the pressing member is formed by two surfaces an interval between which expands toward a lower side, the pressing member is constituted by the rotating body, and the pressing surface may be formed by both surfaces of an annular groove formed in the outer peripheral portion of the rotating body.

In this configuration, the pressing member has the operational effect derived from being the rotating body, the operational effect derived from the fact that the groove formed in the outer peripheral portion of the rotating body constitutes the pressing surface, and the operational effect derived from the fact that the interval between the pressing surfaces of the pressing member expands. As a result, reliable sausage pressing is made possible by the rotating body which moves in the longitudinal direction of the stick at an even higher speed.

Concerning an apparatus for conveying suspended sausage loops while adjusting the suspended form of a chain of linked sausages suspended from a stick in loop form, in accordance with a second aspect of the invention, there is provided a suspended sausage loop conveying apparatus for conveying a stick in a lateral direction to a longitudinal direction of the stick, the stick having a chain of linked sausages suspended therefrom in loop form, comprising: an endlessly circulating conveyor body which moves in a conveying direction while supporting both end portions of the stick; and the already-described device for adjusting the form of suspension of sausages from a stick.

Since it is possible to adjust the form of suspension of the sausages from the stick during the conveyance of the sticks by the endlessly circulating conveyor body, a special place and time for adjusting the suspended form is not separately required, and a time delay does not occur in the delivery of the sausages to the heat treatment process.

Even in the manufacture of sausages of the type in which they are difficult to deform by using a thick and elongated stick for the suspended sausage loop conveying apparatus, the sausages can be adjusted during the conveyance of the sausages, as described above, so that it is possible to structure an automated mass production system without lowering the appearance quality of the sausages.

Since the device for adjusting the form of suspension of sausages from a stick is capable of suppressing the positional deviation of the sausage loops in the longitudinal direction of the stick, the productivity in sausage production can be enhanced by increasing the moving speeds of both the pressing member and the endlessly circulating conveyor body.

In the present invention, the moving mechanism may include the linear movement guiding part, a linearly moving member on which the supporting unit is mounted and which is guided by the linear movement guiding part, and a driving part for driving the linearly moving member so as to move the linearly moving member along the linear movement guiding part, and wherein, while the supporting unit is being moved in the longitudinal direction of the stick, the pressing member is guided movably in the conveying direction by a conveying direction guiding part, such that the pressing member in a state of pressing the sausages follows the movement of the sausages suspended from the stick in the conveying direction of the endlessly circulating conveyor body.

In the present invention, the supporting unit can be moved in the longitudinal direction of the stick at a desired moving speed set in the driving part. It is thereby possible to move the pressing member in the longitudinal direction of the stick at such a speed that allows the pressing of all the loops on the stick being pressed to be completed before a pressing start with respect to loops on an ensuing stick which is being conveyed to a starting point for the ensuing stick in a following manner by the endlessly circulating conveyor body.

Since the pressing member, while moving in the longitudinal direction of the stick, presses the sausages while following the movement of the sausages in the conveying direction of the endlessly circulating conveyor body, it is unnecessary to stop the conveyance by the endlessly circulating conveyor body for the purpose of pressing, so that productivity does not decline.

According to the present invention, since the sausage loops are suspended from the stick in a state in which the stick bites onto the upper end portions of the sausages, the suspended state of the sausages is stabilized, it is possible to prevent the drawback that the linked portion rotates on the outer peripheral surface of the stick and becomes disengaged from the stick during the conveyance of the sticks. As a result, it is possible to increase the conveying speed of the sticks to the heat treatment process.

In the present invention, after the movement of the pressing member from a starting point to a terminating point, with one end side or the other end side in the longitudinal direction of the stick being set as the starting point and the other end side or the one end side in the longitudinal direction of the stick being set as the terminating point, the supporting unit for supporting the pressing member may be adapted to release the pressing of the sausages by the pressing member which has reached the terminating point in preparation for the pressing of the sausages suspended from an ensuing stick which is being conveyed to the starting point for the ensuing stick in a following manner.

Further, in the present invention, the rotating body may be adapted to receive a returning force from a conveying direction returning device for moving the pressing member toward the starting point for the ensuing stick in the opposite direction to the conveying direction of the endlessly circulating conveyor body until the ensuing stick reaches the starting point. At that juncture, in the state in which the pressing of the sausages is released, the pressing member is preferably made slidable along the conveying direction guiding part in the returning direction opposite to the conveying direction by receiving the returning force from the conveying direction returning device. The conveying direction returning device may be arranged to jet a gas with respect to the pressing member in the returning direction.

In addition, the conveying direction returning device may be not of the type in which the gas is jetted to the pressing member, but of the type in which a returning force is mechanically applied to the pressing member.

Furthermore, the pressing member may not alternately effect pressing on the forward path and the return path between the one end side and the other end side of the stick, but may be adapted to effect pressing only on the forward path.

In accordance with a third aspect of the invention, there is provided a method for adjusting the form of suspension of sausages from a stick, comprising the steps of: causing two sausages which, when viewed in the longitudinal direction of the stick, are at an uppermost position of a sausage loop suspended from the stick and are positioned on both sides in a horizontal direction with respect to a center of the stick to be pressed downwardly at positions by a pressing member having a pressing surface formed thereon for abutting against the two sausages, the positions being spaced apart from an outer peripheral surface of the stick and being on both sides of the stick; and moving the pressing member in the longitudinal direction of the stick, wherein, with respect to each loop of a plurality of suspended loops, the two sausages are pressed against the stick to thereby cause a linked portion connecting the two sausages to be brought into close proximity to or into contact with the stick.

This adjusting method makes it possible to obtain effects identical to those obtained by the above-described suspended sausage loop conveying apparatus in terms of the reduction of the amount of deflection of the stick, prevention of a decline in the quality of sausages, and improvement of productivity.

The present invention can be implemented not only with respect to chains of linked sausages suspended from the stick in order to be heat treated in the continuous smokehouse, but also with respect to chains of linked sausages suspended from the stick in order to be subjected to other processing including the heat treatment in a batch-type smokehouse.

According to the present invention, it is possible to provide a method and a device for adjusting the form of suspension of sausages from a stick whereby the suspended form of sausages in which the linked portion of the sausages is floated from the stick can be adjusted into such a suspended form that the linked portion is brought into closer proximity to or, preferably, into contact with the stick, thereby making it possible to prevent a decline in the appearance quality of the sausages and enabling sausage production that yields high productivity, as well as an apparatus for conveying suspended sausage loops which is capable of effecting the above-described adjustment while conveying the suspended sausage loops.

BRIEF DESCRIPTION OF THE DRAWINGS

FIGS. 7A to 7D are diagrams illustrating the manner in which sausages at an uppermost position of a sausage loop suspended from the stick are adjusted and the manner after the adjustment, in which FIG. 7A illustrates a manner prior to pressing in a state in which a linked portion is located immediately above the stick, FIG. 7B illustrates a manner prior to pressing in a state in which the linked portion is at a position of being deviated from the stick, FIG. 7C shows a manner in which the sausages of FIGS. 7A and 7B are being pressed, and FIG. 7D illustrates a manner after the adjustment of the suspended form upon releasing the pressing.

DESCRIPTION OF THE PREFERRED EMBODIMENTS

A description will be given hereinafter of the embodiments of the present invention with reference to the accompanying drawings.

Figure 1:
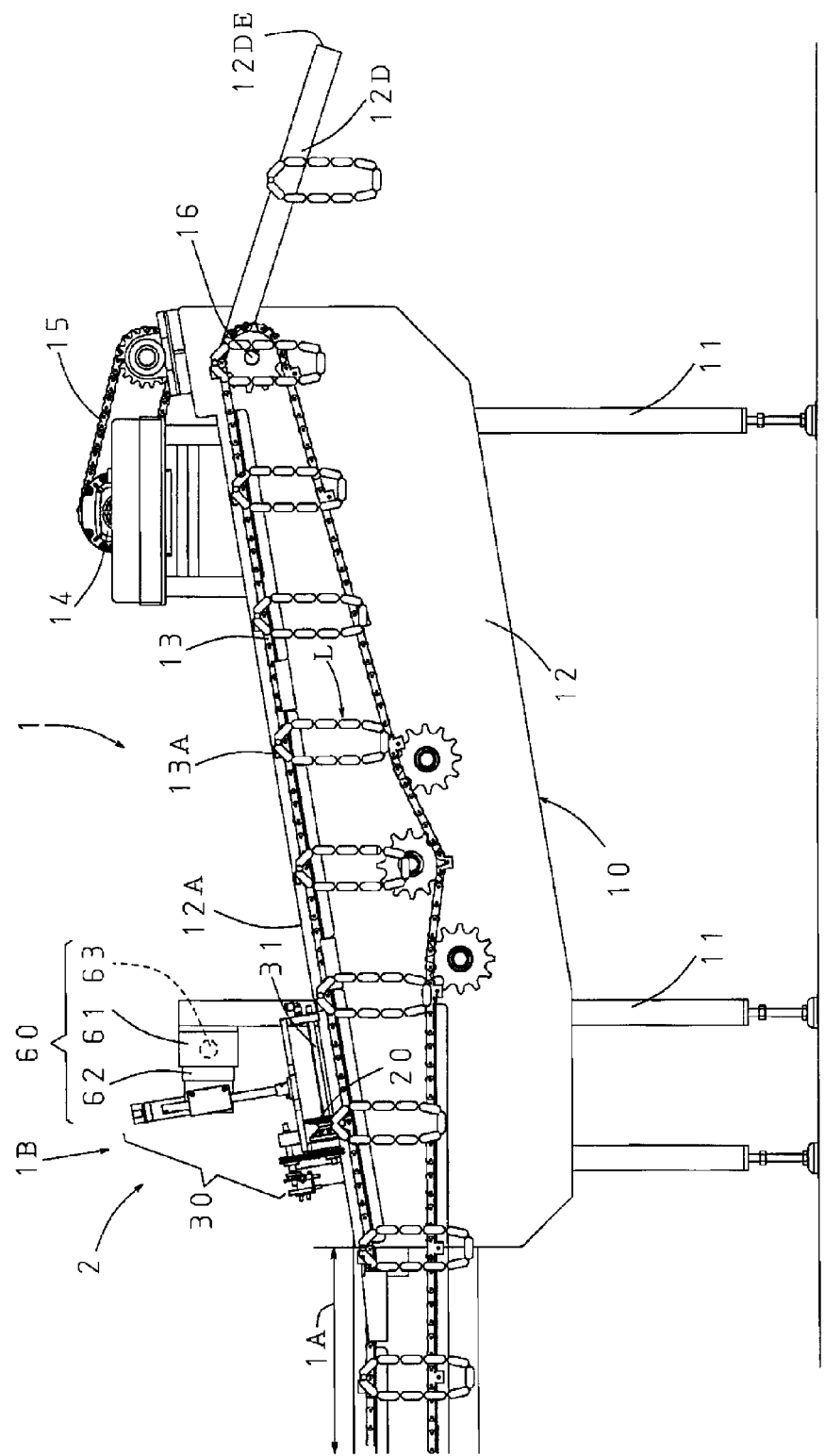
FIG. 1 is a side elevational view illustrating the entirety of a suspended sausage loop conveying apparatus in accordance with an embodiment of the present invention.
Figure 2:
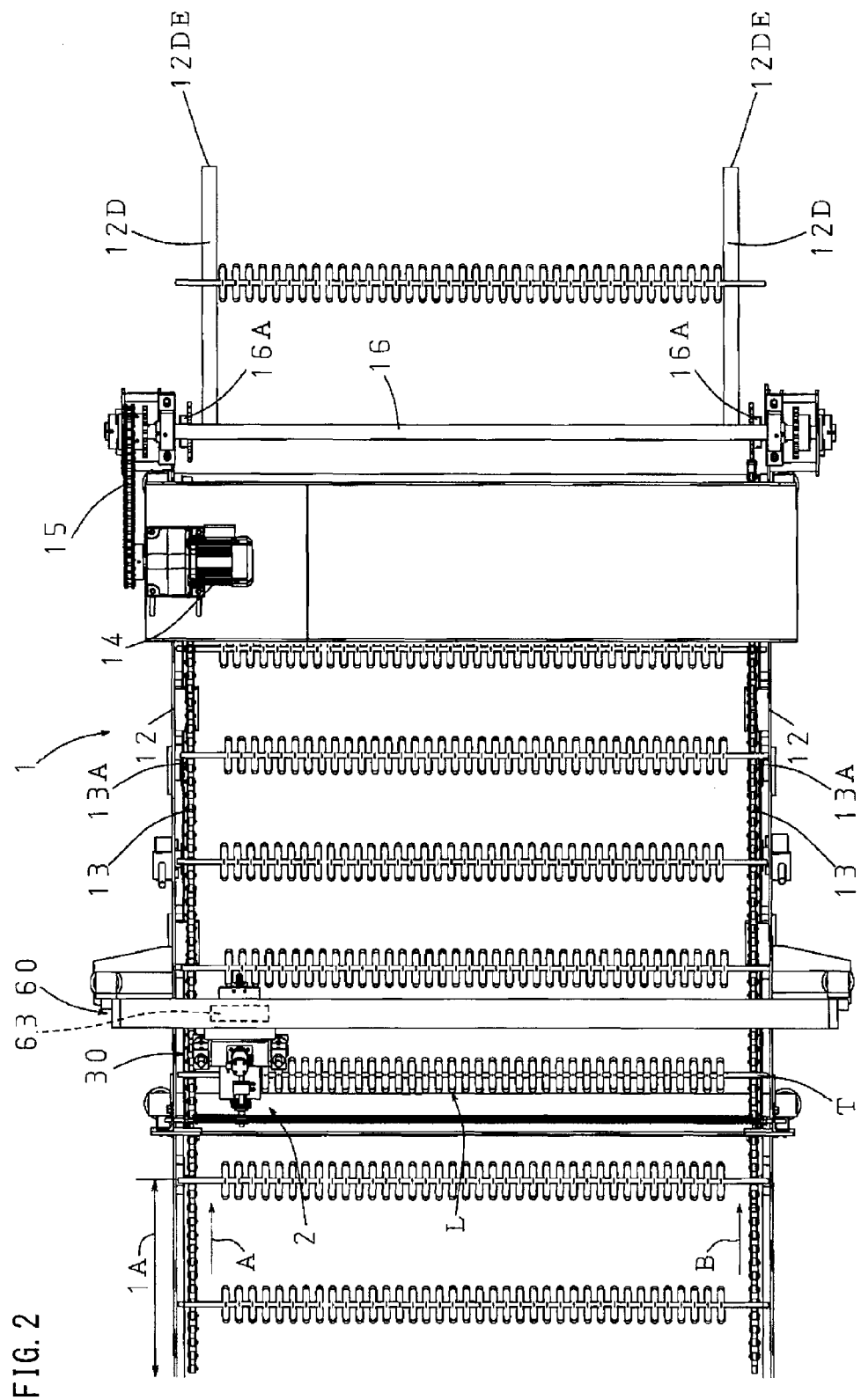
FIG. 2 is a plan view of the apparatus of FIG. 1.
Figure 3:
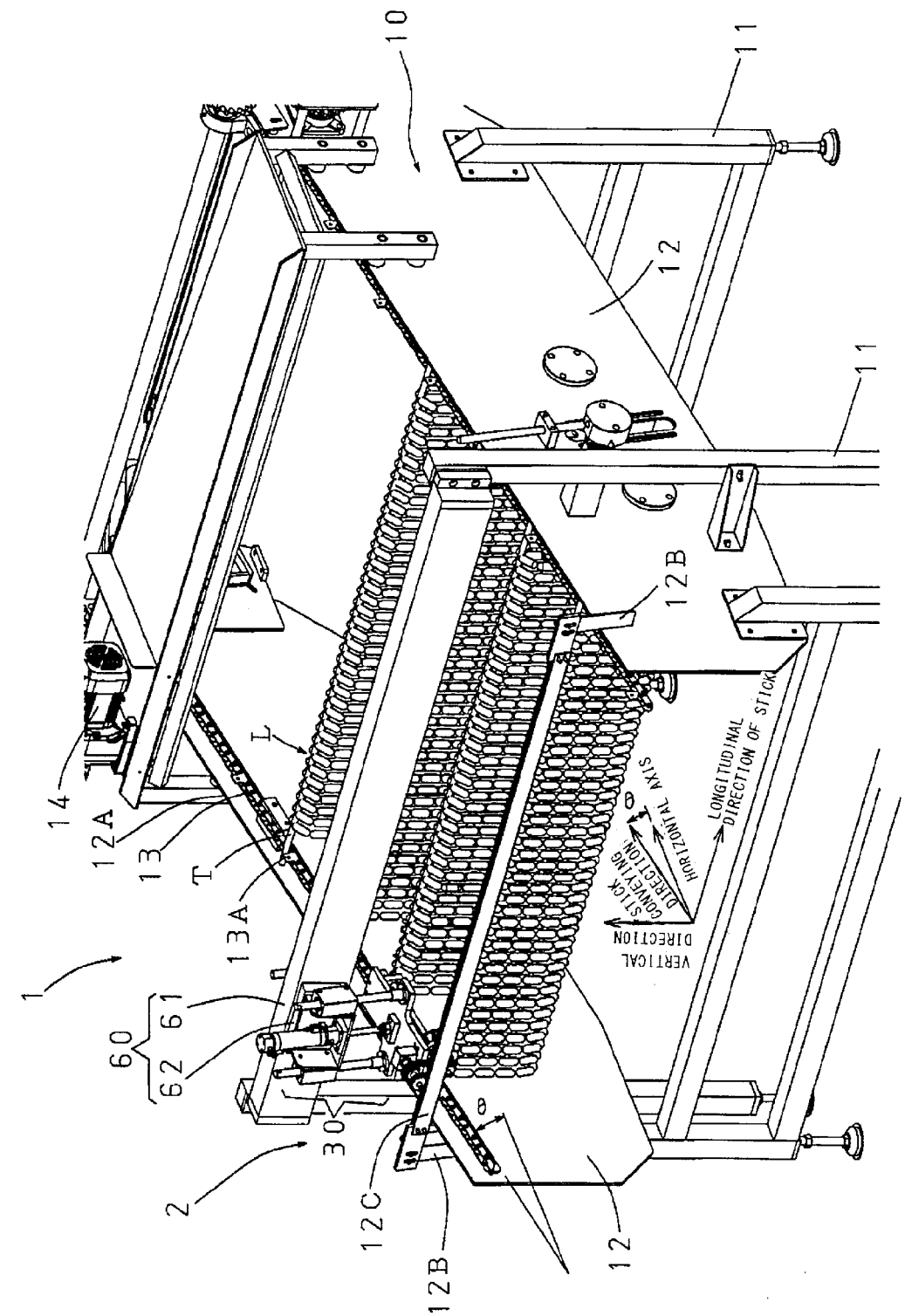
FIG. 3 is a perspective view with a horizontal area of the apparatus of FIG. 1 omitted.

FIG. 1 is a side elevational view illustrating the entirety of a suspended sausage loop conveying apparatus 1 (hereinafter referred to as the "conveying apparatus") in accordance with this embodiment; FIG. 2 is a plan view thereof; and FIG. 3 is a perspective view thereof.

A longitudinal direction of a stick, a horizontal axis perpendicular to the longitudinal direction of the stick and located within a horizontal plane, and a stick conveying direction inclined with respect to the horizontal axis are illustrated in the drawings, where necessary.

The conveying apparatus 1 has a supporting frame body 10 provided with a pair of side plates 12 which are supported by a plurality of leg members 11, are formed by surfaces extending in the vertical direction and in the stick conveying direction, and are positioned in face-to-face relation in the longitudinal direction of the stick.

An upper edge 12A of each of the aforementioned pair of side plates 12 is inclined with respect to the horizontal axis, and an upwardly oriented direction along the upper edge 12A is set as the stick conveying direction. Namely, the stick conveying direction has an angle of inclination θ in such a manner as to be raised upwardly with respect to the horizontal axis, and a conveying chain 13 serving as an endlessly circulating conveyor body is provided on an inner surface of each side plate 12 along the aforementioned upper edge 12A. In the drawings, the conveying chain 13 travels forwardly in the conveying direction with a rising gradient at the angle of inclination θ. The both conveying chains 13 are provided with retaining members 13A for supporting both ends of a plurality of sticks T with sausage loops L suspended therefrom and for positioning the sticks T at predetermined intervals.

A drive motor 14 is disposed on top of the supporting frame body 10 at a forward position in the stick conveying direction so as to rotate a drive shaft 16 extending in the longitudinal direction of the stick through a drive chain 15 and the like and cause the conveying chains 13 to travel by a pair of sprockets 16A mounted at both ends of the drive shaft 16.

After passing through a horizontal area 1A of the conveying apparatus 1 where the conveying chains 13 travel in a horizontal plane, the conveying chains 13 travel forwardly in the conveying direction at the aforementioned at the angle of inclination θ and lift up the sticks T. A pair of stick sliding guide members 12D which are downwardly inclined are provided forwardly of the drive shaft 16 in the conveying direction. The pair of stick sliding guide members 12D are formed by a pair of elongated plate members for guiding the sliding of the stick T by supporting both end portions of the stick T. Terminating end portions 12DE of the stick sliding guide members 12D are located adjacently to an unillustrated continuous smokehouse. The stick T delivered from the conveying chains 13 to the stick sliding guide members 12D is slid downwardly on the stick sliding guide members 12D to the terminating end portions 12DE, and is adapted to be delivered from the terminating end portions 12DE to the continuous smokehouse.

The stick T with the sausage loops L suspended therefrom is placed from an unillustrated known stick transfer device onto the conveying chains 13 traveling in the horizontal area 1A of the conveying apparatus 1. As a known stick transfer device, it is possible to use, for example, a stick vertical transfer device disclosed in the publication of JP-A-2011-45294.

The sticks T each having a multiplicity of sausage loops L (e.g., 40 loops) suspended therefrom at predetermined intervals are being placed on the conveying chains 13. In terms of its size, a stick which is used for subjecting sausages to heat treatment in the continuous smokehouse is formed of a stainless steel material of a round rod shape having an outside diameter of 14 mm and a length of 1500 mm, for example. Meanwhile, a stick which is used for subjecting sausages to heat treatment in a batch-type smokehouse is formed of a stainless steel material of a round rod shape having an outside diameter of 9 mm and a length of 950 mm, for example. Thus, the stick T on the conveying chains 13 is thick and is therefore difficult to be brought into close proximity to a linked portion S1 of sausages S (see FIG. 7A), and is long so that deflection is likely to occur in the stick T.

Figure 7A:
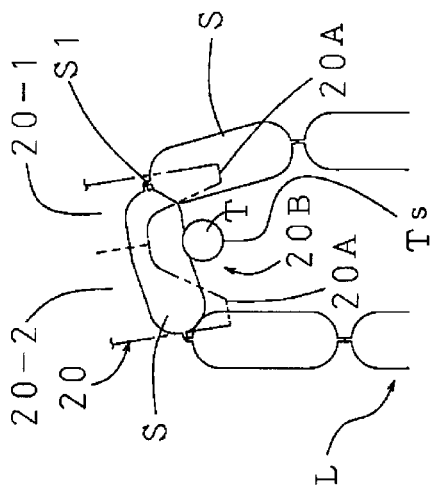

As shown in FIG. 7A, the sausage loop L is suspended from the stick T in a state in which two sausages S adjacent to each other via the linked portion S1 constituted by a twisted portion are suspended from the stick T on both sides of the stick T. Upper end portions Sa of these two sausages S located at an uppermost position of the sausage loop L are in contact with each other, so that deformation due to contact pressure occurs at contact portions Sc of the upper end portions Sa. The two sausages are suspended from the stick T in a state in which their cylindrical body portions Sb are placed on the stick T. If the sausage loops L are subjected to heat treatment in the thus-suspended form as they are, deformation in indented form and unevenness in smoking due to the stick occur in the cylindrical body portions Sb which are in contact with the stick T.

Accordingly, the arrangement provided is such that a device for adjusting the form of suspension of sausages from a stick (hereinafter referred to as the "adjusting device") 2 for adjusting the suspended form of the chain of linked sausages suspended from the stick T in loop form is disposed in a stick-conveying-direction rear position 1B, which is a position beyond the horizontal area 1A, so as to adjust the suspended form of the sausages S conveyed from the horizontal area 1A.

Figure 4:
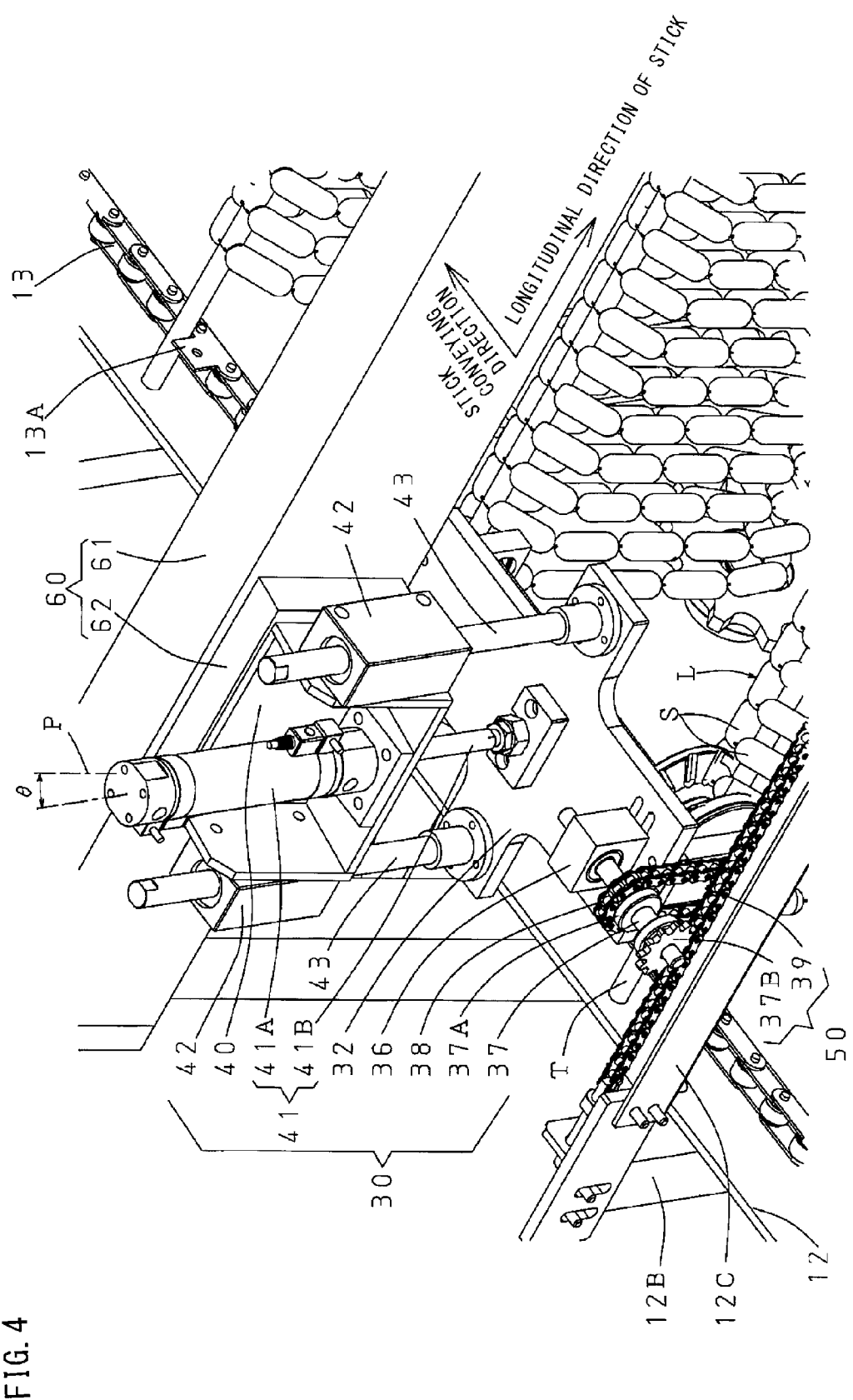
FIG. 4 is a perspective view, taken from above, illustrating a pressing member, a supporting unit, and their vicinities of the apparatus of FIG. 1.

The adjusting device 2 includes a pressing member 20 for pressing the two sausages S against the stick T, the two sausages S being at the uppermost position of the sausage loop L suspended from the stick T, a supporting unit 30 for supporting the pressing member 20, a moving mechanism 60 for moving the supporting unit 30 in the longitudinal direction of the stick T, a rotatively driving unit 50 for converting the movement of the supporting unit 30 into a rotational force, as shown in FIG. 4, and a plurality of rotation transmitting members for transmitting the rotational force to the pressing member 20. The supporting unit 30 is constituted by various members making up a mechanism which, in a state of supporting the pressing member 20, is moved by the moving mechanism 60, as will be described later.

Figure 5:
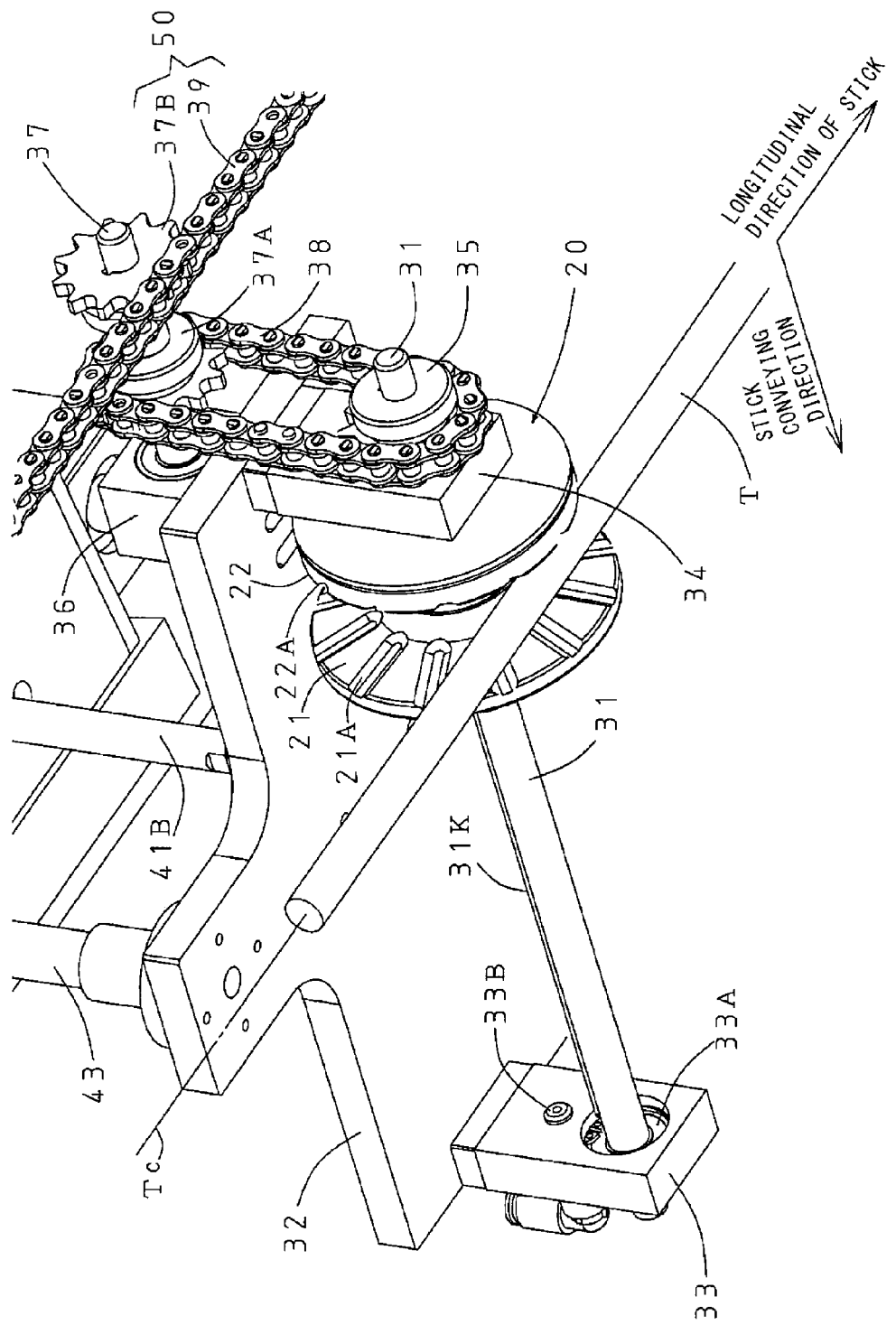
FIG. 5 is a perspective view, taken from below, illustrating the pressing member, the supporting unit, and their vicinities of the apparatus of FIG. 1 with the illustration of sausage loops suspended from a stick omitted.

The pressing member 20 may be either of a rotating type or of a non-rotating type. In this embodiment, however, the pressing member 20 is formed as a rotating body (hereinafter referred to as the rotating body 20) having a rotating surface of a V-shaped groove, as shown in FIG. 4, FIG. 5 in which the sausage loops suspended from the stick T are omitted, and FIG. 6 which is a side elevational view, and two inclined surfaces constituting this rotating surface of the V-shaped groove form pressing surfaces 21 and 22. These pressing surfaces 21 and 22 are located on both sides with respect to a center Tc of the stick T, and the interval therebetween expands toward the lower side, so as to press the sausages S downwardly at two positions which are spaced apart in the horizontal direction from an outer peripheral surface Ts of the stick T and are on both sides of the stick T in the horizontal direction (see FIGS. 7A to 7D).

On both pressing surfaces 21 and 22 formed on an outer peripheral portion 20A of the rotating body 20, pluralities of radial grooves 21A and 22A are formed to prevent the rotating body 20 from slipping with respect to the sausages S during the rotation of the rotating body 20. This rotating body 20 is mounted on a support shaft 31 serving as a below-described conveying direction guiding part extending in the stick conveying direction, and is adapted to rotate integrally with the support shaft 31 in the state of being slidingly movable in the stick conveying direction. The fact that the support shaft 31 extends in the stick conveying direction means that the support shaft 31 has the upwardly inclined angle θ forwardly in the stick conveying direction with respect to the horizontal axis.

Figure 6:
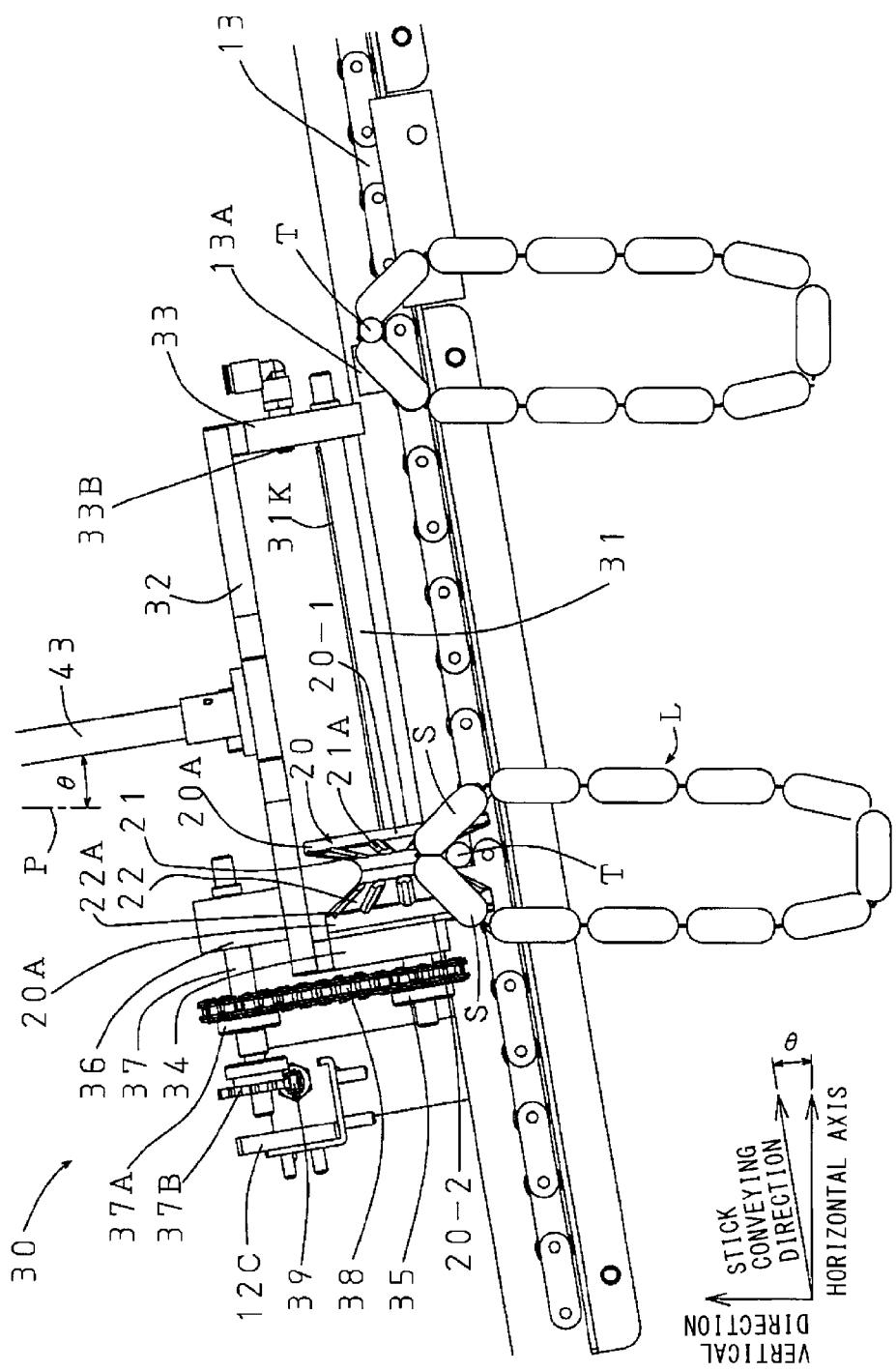
FIG. 6 is a side elevational view, taken from in the longitudinal direction of the stick, illustrating the pressing member, the supporting unit, and their vicinities of the apparatus of FIG. 1 with a side plate on this side omitted.

As for the pressing surface 21 and the pressing surface 22, their constituent angles α with respect to a vertical line P passing through the center Tc of the stick T are formed to be identical angles (25 degrees in this example). In other words, a V-shaped groove 20B (see FIG. 7B) which is one form of the annular groove has an asymmetrical shape with respect to a perpendicular line passing through the center Tc of the stick T with respect to the support shaft 31. In consequence, the two sausages S suspended from the stick T are respectively adapted to be pressed at the same angle with respect to the vertical line P. As shown in FIG. 6, the rotating body 20 has a form in which a front rotating body 20-1 and a rear rotating body 20-2 are combined, and their mating surfaces are positioned on the aforementioned perpendicular line. Since the rotating body 20 has a two-split structure, the groove width of the aforementioned V-shaped groove 20B can be adjusted by changing the mounting interval between the front rotating body 20-1 and the rear rotating body 20-2 on the support shaft 31. In cases where the size of the sausage loops L to be manufactured is changed, the rotating body 20 may be replaced by a rotating body 20 having different constituent angles α, or the groove width of the aforementioned V-shaped groove 20B may be adjusted, as required. The rotating body 20 may have a nonsplit integral structure.

The supporting unit 30 has a supporting base plate 32, and supporting pieces 33 and 34 for supporting the support shaft 31 are provided on the lower surface of the supporting base plate 32 in a suspended manner. The support shaft 31 is rotatably supported by bearings 33A (a bearing accommodated in the supporting piece 34 is not shown in the drawings) accommodated in hole portions of the supporting pieces 33 and 34, and a sprocket 35 is mounted on an end portion of the support shaft 31 through a key so as to rotate integrally with the support shaft 31.

A bearing block 36 is provided on the upper surface of the aforementioned supporting base plate 32, and a rotation transmitting shaft 37 positioned in parallel with the support shaft 31 is rotatably supported by the bearing block 36. The rotation transmitting shaft 37 extends from the bearing block 36 rearwardly in the stick conveying direction, and two sprockets 37A and 37B are mounted thereon, so that the rotation transmitting shaft 37 and the two sprockets 37A and 37B are adapted to rotate integrally through keys. The two sprockets 37A and 37B are situated outwardly of a side end position of the supporting base plate 32, and the sprocket 37A situated at an intermediate portion of the rotation transmitting shaft 37 transmits the rotational force of the rotation transmitting shaft 37 to the sprocket 35 of the support shaft 31 by means of a transmission chain 38. The sprocket 37B serving as a meshing wheel mounted at an end portion of the rotation transmitting shaft 37 meshes with a nontraveling guide chain 39 serving as a linear meshing member stretched straightly in such a manner as to extend in the longitudinal direction of the stick. The guide chain 39 is mounted on a mounting bar 12C whose both ends are held by the pair of side plates 12 through supporting members 12B, respectively, and which extends between both side plates 12, so that the guide chain 39 is prevented from slackening.

Thus, the guide chain 39 and the sprocket 37B meshing with the guide chain 39 constitute the rotatively driving unit 50, and the rotational force in the rotatively driving unit 50 is transmitted to the support shaft 31 through various rotation transmitting members including the rotation transmitting shaft 37 with the sprocket 37B mounted thereon, the sprocket 37A, the transmission chain 38, and the sprocket 35.

The supporting unit 30 further has a shelf-like mounting member 40 for mounting the support unit 30 to a linearly moving member 62 of the below-described moving mechanism 60. A main body portion 41A of a pressing cylinder 41 for pressing the supporting base plate 32 downwardly is held on the mounting member 40, and a lower end of its rod 41B is mounted on the supporting base plate 32. In addition, a pair of slide blocks 42 are respectively mounted on both side plate portions of the mounting member 40, and a pair of guide bars 43 each having one end mounted on the supporting base plate 32 and the other end extending upwardly are slidably guided by the slide blocks 42 so as to be vertically movable. The rod 41B of the pressing cylinder 41 and the guide bars 43 are erected uprightly in a perpendicular direction to the stick conveying direction having the angle of inclination θ with respect to the horizontal axis. This means that the rod 41B and the guide bars 43 are inclined at the same angle θ as the aforementioned angle of inclination θ with respect to the vertical direction P. Thus, the supporting unit 30 is constituted by the supporting base plate 32 and the various members mounted directly on or supported indirectly by the supporting base plate 32, i.e., the mounting member 40, the pressing cylinder 41, the slide blocks 42, and the guide bars 43 which are located on the upper surface side of the supporting base plate 32, as well as the supporting pieces 33 and 34 and the support shaft 31 which are located on the lower surface side of the supporting base plate 32.

As also shown in FIG. 3, the moving mechanism 60 has, at a position spaced apart a predetermined interval with the mounting bar 12C in the stick conveying direction, a linear movement guiding part 61 parallel to the mounting bar 12C, i.e., extending in the longitudinal direction of the stick, as well as a linearly moving member 62 which moves while being guided in the longitudinal direction of the stick by the linear movement guiding part 61, and a driving part 63 (see FIGS. 1 and 2). The linear movement guiding part 61 has the driving part 63 incorporated therein for driving the linearly moving member 62 so as to move the linearly moving member 62. The linear movement guiding part 61 is held at its both ends by the pair of leg members 11.

The moving mechanism 60 in accordance with this embodiment is constituted by a mechanical joint type rodless cylinder made by a pneumatic equipment manufacturer. The mechanical joint type rodless cylinder has a cylinder tube, a piston, a piston yoke, and a slide table. The slide table serving as the linearly moving member 62 is fitted in the cylinder tube serving as the linear movement guiding part 61. The driving part 63 is constituted by the cylinder tube and the piston disposed in the cylinder tube. The slide table is connected to the piston yoke fitted to the piston, and therefore the linearly moving member 62 is adapted to move, together with the piston which effects reciprocating linear motion, while being guided by the linear movement guiding part 61.

In this embodiment, the moving mechanism 60 may be constituted by a linear guide unit made by a linear guide equipment manufacturer and the aforementioned mechanical joint type rodless cylinder provided in juxtaposition to the linear guide unit. The linear guide unit has a track rail serving as the linear movement guiding part 61 and the slide unit serving as the linearly moving member 62. The aforementioned slide table of the rodless cylinder is connected to the slide unit, and therefore the linearly moving member 62 is adapted to move together with the slide table while being guided by the linear movement guiding part 61. In this moving mechanism 60, the mechanical joint type rodless cylinder constitutes the driving part 63.

In this embodiment, the moving mechanism 60 may be constituted by the aforementioned linear guide unit and a wrapping connector provided in juxtaposition to the linear guide unit. The wrapping connector has a pair of timing pulleys, a timing belt wound around and trained between them, a mover fixed to the timing belt, and a motor for rotatively driving the timing pulley. The motor effects the normal/reverse rotational driving of the timing pulley so as to reciprocally move the mover. The mover is connected to the slide unit serving as the linearly moving member 62 of the linear guide unit, and therefore the linearly moving member 62 is adapted to move together with the mover while being guided by the linear movement guiding part 61. In this moving mechanism 60, the wrapping connector constitutes the driving part 63.

The above-described moving mechanism 60 is not limited to general-purpose products such as commercially available air cylinder products and linear guide products. Furthermore, as the driving part 63, in addition to the already-described driving parts, it is possible to adopt, as required, a general-purpose linear actuator of the type in which the slide unit is driven by electric or electromagnetic force; however, the driving part 63 is not limited to these commercially available general-purpose products.

Between the supporting pieces 33 and 34 having bearings incorporated therein for rotatably supporting the support shaft 31 which supports the above-described rotating body 20 serving as the pressing member, a nozzle 33B serving as a conveying direction returning device for jetting a gas is provided in the supporting piece 33 located forwardly in the stick conveying direction. When the rotating body 20 has slidingly moved to a position very close to the supporting piece 33 on the support shaft 31, this approach is detected by an unillustrated detector, and the nozzle 33B jets a gas, e.g., compressed air to press the side surface of the rotating body 20 so as to cause the rotating body 20 to move away from the supporting piece 33 and return toward the other supporting piece 34 located on the opposite side in the stick conveying direction. Since the support shaft 31 has the angle of inclination θ, the supporting piece 33 side is located at a higher position and the supporting piece 34 side is located at a lower position, so that the rotating body 20, upon receiving the compressed air thus jetted, is returned extremely smoothly to the position on the supporting piece 34 side.

Next, a description will be given of the operation of the device for adjusting the suspended form of sausages in the apparatus of this embodiment thus configured.

As shown in FIGS. 1 to 3, the plurality of sticks T in the state in which the sausage loops L are respectively suspended therefrom are conveyed at fixed intervals by being supported at both end portions of the sticks T by the conveying chains 13. The position where the stick T is supported by the conveying chain 13 is the position where the stick T abuts against the retaining member 13A forwardly of the retaining member 13A in the conveying direction and is pressed by the retaining member 13A.

As described before, such sticks T are conveyed in the state of being arranged on the conveying chains 13 traveling in the already-described horizontal area 1A at a position located rearwardly of the rotating body 20 in the conveying direction. When the stick T reaches a position immediately below the rotating body 20 in the conveying direction, this arrival is detected by a detector (not shown), and the rotating body 20 which is positioned immediately above the stick T on one end side A of the stick T is lowered together with the supporting base plate 32 by the actuation of the pressing cylinder 41, and is brought to a position where the rotating body 20 is capable of pressing the sausages S at the uppermost position of the sausage loop L suspended from the stick T. After the lowering of this rotating body 20, the driving part 63 of the moving mechanism 60 is operated, and the linearly moving member 62 moves to the other end side B of the stick T in the longitudinal direction of the stick (as for the one end side A and the other end side B, see FIG. 2) while being guided by the linear movement guiding part 61.

When the above-described linearly moving member 62 moves toward the other end side B of the stick, the mounting member 40 mounted on the linearly moving member 62 and the supporting unit 30 including the mounting member 40 also move in the same direction. Accordingly, the rotation transmitting shaft 37 which is supported by the bearing block 36 mounted on the supporting base plate 32, i.e., a part of the supporting unit 30, also moves, and the sprocket 37B mounted on the rotation transmitting shaft 37 moves along the guide chain 39 while rotating in meshing relation to the guide chain 39. The rotation of the aforementioned sprocket 37B is transmitted to the sprocket 35 of the support shaft 31 by the various rotation transmitting members, i.e., through the rotation transmitting shaft 37, another sprocket 37A on the rotation transmitting shaft 37, and the transmission chain 38. Therefore, the rotational force of this sprocket 35 rotatively drives the rotating body 20 mounted on the support shaft 31 through a key 31K (see FIG. 6) fixed to the support shaft 31.

Thus, the rotating body 20 which is being rotatively driven is moved, while rotating, from a starting point on the one end side A of the stick T to a terminating point on the other end side B thereof in such a manner as to press the sausages S at the uppermost position of the sausage loops L on the stick T by the actuation of the already-described pressing cylinder 41. Since the aforementioned rotating body 20 is supported slidingly movably in the axial direction of the support shaft 31 by the support shaft 31 extending in the stick conveying direction, the rotating body 20 is slidingly moved on the support shaft 31 in a following manner in the stick conveying direction in the state of being engaged with the sausages S suspended from the stick T being conveyed by the conveying chains 13, while rotatingly pressing the sausages S at the uppermost position and moving toward the other end side B in the longitudinal direction of the stick. A description will be given later of the pressing of the sausages S by the rotating body 20 and the adjusting of the sausage suspended from by the pressing.

The rotating body 20, while moving from the one end side A to the other end side B of the stick T, is slidingly moved on the support shaft 31 while following the stick T in the stick conveying direction as well. When the rotating body 20 reaches the other end side B of the stick T, the pressing cylinder 41 is actuated in such a manner as to lift the supporting base plate 32 upwardly and, hence, lift the rotating body 20 upwardly, whereupon the rotating body 20 is released from pressing the sausages S. At the point of time when the rotating body 20 has thus reached the other end side B of the stick, compressed air is jetted from the nozzle 33B toward the side surface of the rotating body 20. Since the rotating body 20 has been raised to a position where the stick T is disengaged from between the pressing surfaces 21 and 22 forming the V-shaped groove of the rotating body 20, the rotating body 20, upon receiving the dynamic pressure of compressed air jetted from this nozzle 33B, is slidingly moved on the support shaft 31 in the opposite direction to the stick conveying direction and is returned to the position in close proximity to the other supporting piece 34.

Thus, the rotating body 20 is located on the other end side B of the stick T and at a position above the stick T and is set on standby in preparation for the arrival of an ensuing stick T. When the ensuing stick T comes to the position immediately below the rotating body 20, the detector detects the aforementioned arrival and the rotating body 20 is lowered again by the actuation of the pressing cylinder 41, and is brought to the position capable of pressing the sausages S. Then, the driving part 63 of the moving mechanism 60 is operated again to move the linearly moving member 62 in the returning direction toward the one end side A of the stick T. As a result, while returning toward the terminating point on the one end side A of the stick T by setting as a starting point the other end side B of the stick T, which was the terminating point of the preceding stick T, the rotating body 20 presses two sausages S at the uppermost position of each sausage loop L suspended from the stick T with respect to the ensuing stick T in the same way as with the preceding stick T. Thus, when returning to the one end side A of the stick T, the rotating body 20 is being moved in the stick conveying direction as well, so that the rotating body 20 is lifted upwardly by the pressing cylinder 41 upon returning to the one end side A of the stick T, is slid on the support shaft 31 by the reoperation of the nozzle 33B, and is returned to the position of the starting point for the preceding stick T. Thus, in this embodiment, the rotating body 20 presses the sausages S during its forward path movement and return path movement in the longitudinal direction of the stick T.

Thus, the rotating body 20, which serves as the pressing member, is lowered by the actuation of the pressing cylinder 41 from a raised end position where the two pressing surfaces 21 and 22 forming the V-shaped groove are in the state of being disengaged from the stick T to a position capable of pressing two sausages S, e.g., a position spaced apart 5 mm from the outer peripheral surface Ts of the stick T, and is maintained at the just-mentioned pressing capable position during the pressing against all the sausage loops L. Since the two pressing surfaces 21 and 22 press the sausages S at the positions spaced apart from the outer peripheral surface Ts of the stick T, the stick T is likely to deform and bite onto the upper end portions Sa. When the pressing of all the sausage loops L is completed, the rotating body 20 is raised to the raised end position by the actuation of the pressing cylinder 41.

The phrase that "the rotating body 20 is maintained at the pressing capable position" is meant to include not only that "it is maintained at a fixed position" but also that "it is maintained in a pressing capable range of position." Namely, even if the pressing member is moved in the longitudinal direction of the stick while varying its position vertically, since the vertically varied position falls within the pressing capable range, all the loops suspended from the stick are pressed by the pressing member.

Next, with reference to FIGS. 7A to 7D, a description will be given of how the adjustment of the suspended form of the sausages S is carried out by the pressing of the sausages S by means of the rotating body 20 serving as the pressing member. Reference character Sn shown in FIG. 7A denotes the respective sausage links constituting the chain of linked sausages. One sausage link Sn has an upper end portion Sa1, i.e., a semispherical body portion, and a lower end portion Sa2, i.e., another semispherical body portion, which form both end portions, as well as the cylindrical body portion Sb formed therebetween.

Figure 7B:
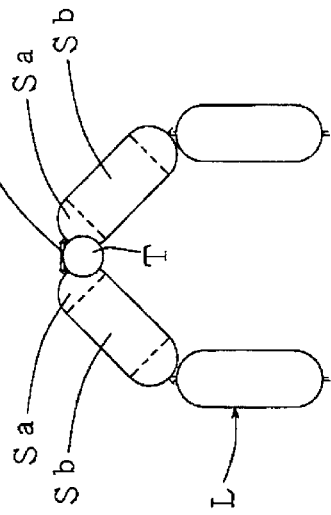
Figure 7C:
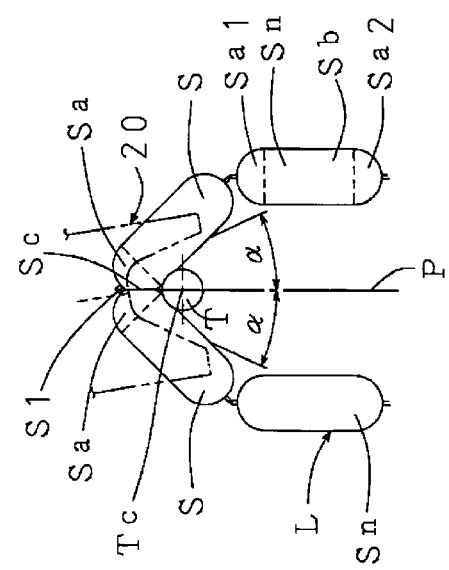

FIGS. 7A and 7B show the state in which the rotating body 20 indicated by the dashed two-dotted line is in a state before pressing the sausages, i.e., at a position on a starting point side or at a position between adjacent ones of the sausage loops, and FIG. 7C shows a position where the rotating body 20 indicated by the solid line is pressing the sausages S In FIG. 7A, as for the sausage loop L, the linked portion S1 of the two sausages S at the uppermost position, which are on both sides in the horizontal direction with respect to the center of the stick T, is located immediately above the stick T, and is in a suspended state before being pressed by the rotating body 20. The pressing surfaces 21 and 22, when viewed in the longitudinal direction of the stick T, are arranged so as to press the two sausages S downwardly at two positions which are spaced apart in the horizontal direction from the outer peripheral surface Ts of the stick T and are on both sides of the stick T. With respect to such a sausage loop L, when the rotating body 20, while rotating, moves in the longitudinal direction of the stick T from the one end side A of the stick T toward the other end side B of the stick T, the rotating body 20 at its two pressing surfaces 21 and 22 formed in the shape of the V-groove presses the upper end portions Sa of the two sausages S at the uppermost position or the cylindrical body portion Sb of one of these two sausages S toward the stick T.

Figure 7D:
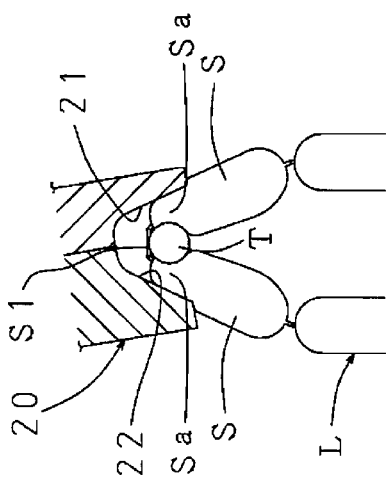

Since the pressing force acting on the stick T at the time of pressing the two sausages is small, and the point of application of that small pressing force moves in the longitudinal direction of the stick T together with the movement of the rotating body 20, an excessively large pressing force is not applied to the stick T, so that the amount of deflection of the stick T is suppressed. In consequence, as shown in FIG. 7C, the stick T continues to bite onto the upper end portions Sa of the sausages S while deforming the upper end portions Sa, and the linked portion S1 is brought closer to the stick T than in FIG. 7A or into contact with the stick T. Since the aforementioned two pressing surfaces 21 and 22 are formed in the shape of the V-groove, the two sausages S are brought into close proximity to or into contact with the stick T in a state in which the twist of the linked portion S1 is stretched, as shown in FIG. 7C. After the rotating body 20 has passed and its pressing of the two sausages S has been released, the two sausages S are suspended from the stick T in a state in which the stick T has bitten onto the upper end portions Sa, as shown in FIG. 7D. The suspended form of the sausages S is thus adjusted.

Next, in cases where the linked portion S1 of the sausages S at the uppermost position of the sausage loop L is situated in such a way as to be deviated from the stick T, the rotating body 20 at the time of starting the pressing presses one sausage S riding on the stick T more strongly than the other sausage S, so that the one sausage S is pulled downwardly. Accordingly, in conjunction with the movement of the rotating body 20 which rotates, the linked portion S1 is pulled and returned to the position immediately above the stick T, and the two sausages S at the uppermost position are pressed, thereby causing the linked portion S1 to be brought into close proximity to or into contact with the stick T.

Since the stick T suspends the sausages S in the state of having bitten onto the upper end portions Sa, even if there occurs an impact acting on the stick T and the sausage loops L, which can occur at the time of delivery of the stick T from the conveying chains 13 onto the stick sliding guide members 12D, or at the time of arrival of the stick T at the terminating end portions 12DE of the stick sliding guide members 12D, or at the time of delivery of the stick T from the stick sliding guide members 12D to the continuous smokehouse, the linked portion S1 is not deviated from the stick T, and the suspended length of the sausage loops L is not greatly disarranged. Accordingly, productivity does not decline.

In the already-described apparatus of the embodiment, although the adjusting device 2 is provided on the conveying apparatus 1 having the conveying chains 13 traveling in such a manner as to be inclined upwardly in the stick conveying direction, the conveying direction of the conveying chains 13 is determined by such as the height of the horizontal area 1A of the conveying apparatus 1 and the height of delivery of the stick T to a heat treatment apparatus including the continuous smokehouse. Therefore, according to these various conditions for each sausage manufacturing line, the conveying apparatus 1 is also required which has the conveying chains 13 whose conveying direction is a horizontal direction or a downwardly inclined direction, instead of traveling in the upwardly inclined manner.

In the adjusting apparatus 2 used in the conveying apparatus 1 having the above-described configuration, if the support shaft 31 of the rotating body 20 is provided in such a manner as to extend in the same direction (direction of the horizontal axis in FIG. 3) as the conveying direction, the rotating body 20 engaged with the sausages S which are conveyed by the conveying chains 13 slides smoothly on the support shaft 31, so that it suffices if the support shaft 31 is configured to extend in the horizontal direction or the downwardly inclined direction in correspondence with the conveying chains 13.

With the rotating body 20 whose support shaft 31 is provided horizontally, it suffices if the pressing surface 21 and the pressing surface 22 are disposed symmetrically about a perpendicular line passing through the center Tc of the stick T with respect to the support shaft 31, so that the respective constituent angles α of the pressing surface 21 and the pressing surface 22 with respect to the vertical line P passing through the center Tc of the stick T are set at identical angles.

The adjusting device 2 may be provided not on the conveying apparatus 1 but on a stick supporting device for supporting the stick T in a stationary state. In this second embodiment which is not illustrated, the adjusting device 2 is mounted on a frame of the stick supporting device such that the linear movement guiding part 61 becomes parallel to the stick T which is supported by the stick supporting device. In the second embodiment, the arrangement provided is such that when one stick T with the multiplicity of sausage loops L suspended therefrom is placed on the stick supporting device, the adjusting device 2 is started to lower the pressing member 20, and when the pressing of all the sausages S suspended from the one stick T is completed, the pressing member 20 is raised, and the adjusting device 2 is stopped.

In the second embodiment, the adjusting device 2 may be configured such that the moving mechanism 60 is not provided with the driving part 63. The moving mechanism 60 may be constituted by, for example, the already-described linear guide unit, and an apparatus operator for performing the supply of the stick T to the stick supporting device and the taking out of the stick T from the stick supporting device may manually operate either the slide unit of the linear guide unit serving as the linearly moving member 62 or the supporting unit 30 mounted on the slide unit.

In this second embodiment as well, simply by moving the pressing member 20 in the longitudinal direction of the stick T, the pressing can be finished in a short time with respect to all the multiplicity of sausage loops L suspended from the elongated stick T. Thus, the apparatus yields high productivity.

What is claimed is:

1. A device for adjusting the form of suspension of sausages from a stick, comprising:
   a pressing member for pressing against a stick two sausages which are at an uppermost position of a sausage loop suspended from the stick; and
   a moving mechanism for supporting said pressing member at a position where said pressing member is capable of pressing the two sausages and for causing said pressing member to be movable in a longitudinal direction of the stick,
   wherein said pressing member has a pressing surface for downwardly pressing the two sausages being at the uppermost position which are on both sides in the horizontal direction with respect to a center of the stick, said pressing being effected at positions which are spaced apart from an outer peripheral surface of the stick and are on both sides of the stick in a horizontal direction, to thereby cause a linked portion connecting the two sausages to be brought into close proximity to or into contact with the stick, and
   wherein said moving mechanism has a linear movement guiding part for guiding in the longitudinal direction of the stick a supporting unit for supporting said pressing member.

2. The device for adjusting the form of suspension of sausages from a stick according to claim 1, wherein said pressing member is constituted by a rotating body, and the pressing surface is formed on an outer peripheral portion of the rotating body.

3. The device for adjusting the form of suspension of sausages from a stick according to claim 2, wherein said rotating body has an annular groove formed in the outer peripheral portion thereof, and the pressing surface is formed by both surfaces of the groove.

4. The device for adjusting the form of suspension of sausages from a stick according to claim 2, wherein said supporting unit has a support shaft which is fitted in said rotating body to support said rotating body, and said support shaft receives a rotatively driving force from a rotatively driving unit to rotatively drive said rotating body.

5. The device for adjusting the form of suspension of sausages from a stick according to claim 1, wherein the pressing surface of said pressing member is formed by two surfaces which are positioned on both sides with respect to the center of the stick, an interval between the two surfaces expanding toward a lower side.

6. A suspended sausage loop conveying apparatus for conveying a stick in a lateral direction to a longitudinal direction of the stick, the stick having a chain of linked sausages suspended therefrom in loop form, comprising:
   an endlessly circulating conveyor body which moves in a conveying direction while supporting both end portions of a stick; and
   a device for adjusting a form of suspension of sausages from the stick, comprising:
   a pressing member for pressing against a stick two sausages which are at an uppermost position of a sausage loop suspended from the stick; and
   a moving mechanism for supporting said pressing member at a position where said pressing member is capable of pressing the two sausages and for causing said pressing member to be movable in a longitudinal direction of the stick,
   wherein said pressing member has a pressing surface for downwardly pressing the two sausages being at the uppermost position which are on both sides in the horizontal direction with respect to a center of the stick, said pressing being effected at positions which are spaced apart from an outer peripheral surface of the stick and are on both sides of the stick in a horizontal direction, to thereby cause a linked portion connecting the two sausages to be brought into close proximity to or into contact with the stick, and wherein said moving mechanism has a linear movement guiding part for guiding in the longitudinal direction of the stick a supporting unit for supporting said pressing member.

7. The suspended sausage loop conveying apparatus according to claim 6, wherein said moving mechanism includes the linear movement guiding part, a linearly moving member on which said supporting unit is mounted and which is guided by the linear movement guiding part, and a driving part for driving the linearly moving member so as to move the linearly moving member along the linear movement guiding part, and wherein, while said supporting unit is being moved in the longitudinal direction of the stick, said pressing member is guided movably in the conveying direction by a conveying direction guiding part, such that said pressing member in a state of pressing the sausages follows the movement of the sausages suspended from the stick in the conveying direction of said endlessly circulating conveyor body.

8. A method for adjusting the form of suspension of sausages from a stick, comprising the steps of:
  causing two sausages which are at an uppermost position of a sausage loop suspended from the stick and are positioned on both sides in a horizontal direction with respect to a center of the stick to be pressed downwardly at positions by a pressing member having a pressing surface formed thereon for abutting against the two sausages, said positions being spaced apart from an outer peripheral surface of the stick and being on both sides of the stick; and
  moving said pressing member in the longitudinal direction of the stick,
  wherein, with respect to each loop of a plurality of suspended loops, the two sausages are pressed against the stick to thereby cause a linked portion connecting the two sausages to be brought into close proximity to or into contact with the stick.

* * * * *